(12) United States Patent
Gonzalez

(10) Patent No.: US 6,962,020 B2
(45) Date of Patent: Nov. 8, 2005

(54) FISHING LEADER HOLDER AND METHOD

(75) Inventor: Fernando Gonzalez, 783 108th Ave., Naples, FL (US) 34108

(73) Assignees: Fernando Gonzalez, Naples, FL (US); Elier Gonzalez, Naples, FL (US)

( * ) Notice: Subject to any disclaimer, the term of this patent is extended or adjusted under 35 U.S.C. 154(b) by 19 days.

(21) Appl. No.: 10/800,808

(22) Filed: Mar. 15, 2004

(65) Prior Publication Data

US 2005/0198891 A1    Sep. 15, 2005

(51) Int. Cl.$^7$ ............................................. A01K 97/06
(52) U.S. Cl. ........................................ 43/57.2; 43/57.1
(58) Field of Search ................................ 43/57.2, 57.1

(56) References Cited

U.S. PATENT DOCUMENTS

| | | | | |
|---|---|---|---|---|
| 742,040 | A | * | 10/1903 | Kurtz, Sr. ..................... 43/57.2 |
| 1,416,142 | A | * | 5/1922 | Trumble ...................... 43/57.2 |
| 1,451,256 | A | * | 4/1923 | Gardner ....................... 43/57.2 |
| 1,539,915 | A | * | 6/1925 | Shebat ......................... 43/57.1 |
| 2,225,309 | A | * | 12/1940 | Lawrence ................... 43/57.2 |
| 2,488,160 | A | * | 11/1949 | Behr ............................ 43/57.2 |
| 2,525,057 | A | * | 10/1950 | Anderson .................... 43/57.1 |
| 2,604,721 | A | * | 7/1952 | Casciano ..................... 43/57.2 |
| 2,629,200 | A | * | 2/1953 | Woodhead .................. 43/57.2 |
| 2,667,010 | A | * | 1/1954 | Anderson .................... 43/57.2 |
| 2,670,563 | A | * | 3/1954 | Anderson .................... 43/57.2 |
| 2,770,064 | A | * | 11/1956 | Kelley ......................... 43/57.2 |
| 2,804,717 | A | * | 9/1957 | Ripperdan ................... 43/57.2 |
| 2,917,862 | A | * | 12/1959 | McCarthy .................... 43/57.1 |
| 3,180,053 | A | * | 4/1965 | Norton et al. ................ 43/57.2 |
| 3,213,564 | A | * | 10/1965 | Borell ......................... 43/57.2 |
| 3,224,134 | A | * | 12/1965 | Holcombe ................... 43/57.1 |
| 3,564,755 | A | * | 2/1971 | Lindgren, Sr. ............... 43/57.2 |
| 3,713,244 | A | * | 1/1973 | Alotta ......................... 43/57.2 |
| 4,179,834 | A | * | 12/1979 | Thomas ...................... 43/57.2 |
| 4,437,258 | A | * | 3/1984 | Allard ......................... 43/57.2 |
| 4,835,901 | A | * | 6/1989 | Waldvogel ................... 43/57.1 |
| 4,866,875 | A | * | 9/1989 | Bliven ........................ 43/57.2 |
| 4,961,281 | A | * | 10/1990 | Listebarger, Jr. ............. 43/57.2 |
| 4,977,700 | A | * | 12/1990 | Perlman et al. .............. 43/57.2 |
| 5,337,511 | A | * | 8/1994 | Ashbaugh ................... 43/57.1 |
| 5,440,829 | A | * | 8/1995 | Parvin ......................... 43/57.1 |

(Continued)

FOREIGN PATENT DOCUMENTS

AU             9922523 A1 * 10/1991

(Continued)

*Primary Examiner*—Darren W. Ark
(74) *Attorney, Agent, or Firm*—The Livingston Firm

(57) ABSTRACT

A fishing leader holder which allows fishermen and fisherwomen to carry leaders of various lengths without the threat of the leaders becoming bent or being caught on other objects. The fishing leader holder (1) is comprised of a holder (1) and two ends (2) and (3) that receive fishing hooks (8). The holder (1), preferably made of PVC pipe, is hollow, cylindrically-shaped and has cut out windows (5) for the acceptance of leaders (9). The holder (1) has a first frayed end (2) and a second corked end (3). Optional holes (6), which also hold fishing hooks (8), may be included on the holder (1), as well as an optional cap (10) which would prevent the hooks (8) from falling out of the slots (4) on the frayed end (2). Because the leaders (9) are stored within the device rather than outside the device, the user need not be concerned with the leaders (9) becoming caught on external objects. Additionally, because the leaders (9) are not wrapped around an object, the user need not be concerned with the leaders (9) becoming bent.

5 Claims, 1 Drawing Sheet

U.S. PATENT DOCUMENTS 5,533,297 A * 7/1996 Crosby .................. 43/57.2

FOREIGN PATENT DOCUMENTS

| DE | 4341051 | C1 | * | 5/1995 | | |
| FR | 2761231 | A1 | * | 10/1998 | | |
| GB | 713404 | A1 | * | 8/1954 | .................. | 43/57.2 |
| GB | 1216941 | A1 | * | 12/1970 | .................. | 43/57.1 |
| GB | 2392074 | A1 | * | 2/2004 | | |
| JP | 10-215747 | B1 | * | 8/1998 | | |
| JP | 2002-209490 | B1 | * | 7/2002 | | |

* cited by examiner

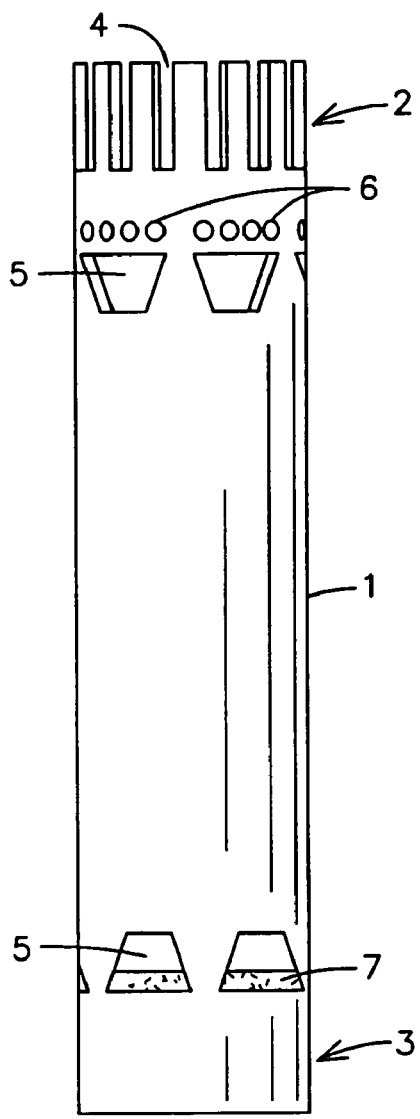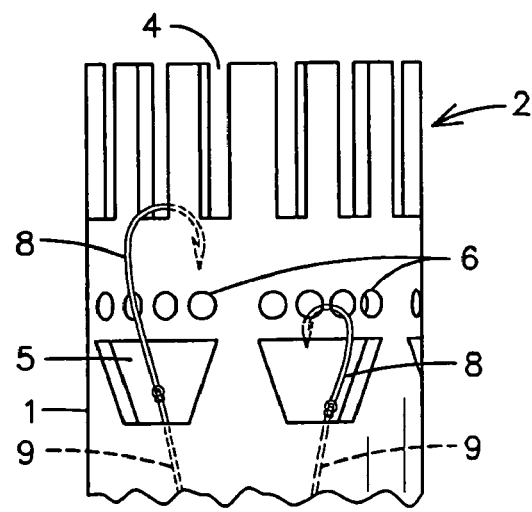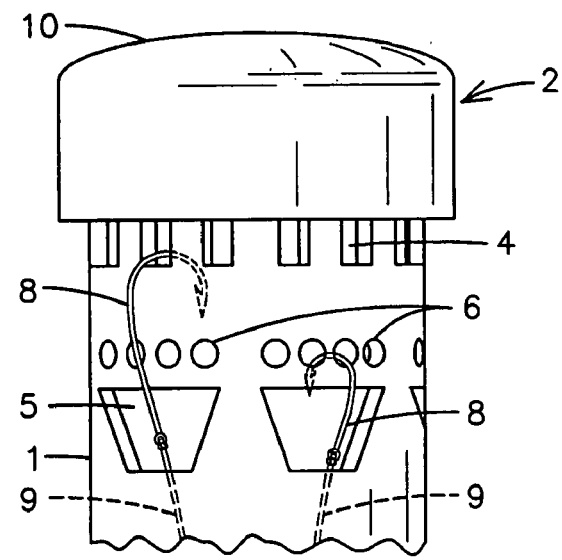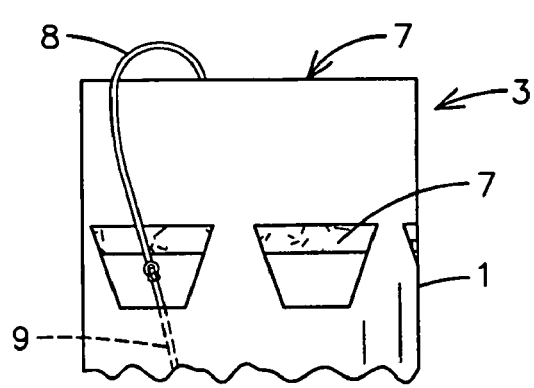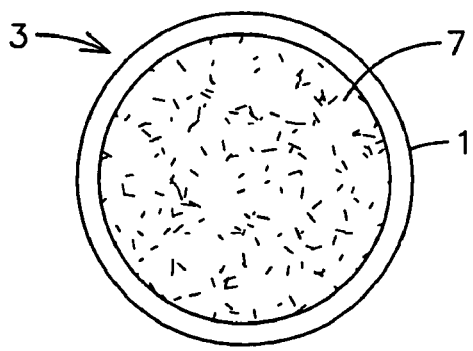
FIG. 1
FIG. 2
FIG. 3
FIG. 4
FIG. 5

FISHING LEADER HOLDER AND METHOD

BACKGROUND OF THE INVENTION

This invention relates to fishing leader holders, more specifically, a fishing leader holder that allows a user to carry leaders of various lengths without the threat of the leaders becoming bent or being caught on other objects.

Fishing has been a long-time favorite outdoor activity for many. The calming water, the peace and quiet and simplistic nature of the sport entice all people, from young and old to novice and professionals, to get outside and go fishing. As in most sports, having the proper equipment is a key factor in obtaining the desired results.

In the sport of fishing, equipment at its most basic form includes a fishing pole, fishing line, a hook and bait. However, to achieve better results, fishing leaders are commonly used to separate the fishing line from the hook and bait to enable precise and gentle fly set-up on the water when casting.

However, one leader may not be adequate for all types of fishing conditions. As such, leaders are made in differing lengths, with some as small as three inches in length to some as large as at least nine feet in length, and of differing materials, single wire or multi-wire, for example, in order to accommodate various fishing and weather conditions, fish types and individualized fishing techniques. Therefore, these various types of leaders need to be readily available to the fisherman or fisherwoman in order for him or her to adjust to the varying fishing and weather conditions.

Currently, there are several ways in which a fisherperson may carry the various sized leaders. For example, he or she may carry the leaders in a tackle box. However, this method allows for easy tangling of the leaders. In the alternative, the fisherperson may carry the various sized leaders in devices known as leader holders. However, current leader holders are deficient in that they either require the leaders to be wrapped around the holder, thus causing the leaders to bend, or are attached to a holder so the leaders are exposed to the environment, thereby allowing the leaders to be caught on other objects. Additionally, it is difficult to access the leaders from current leader holders.

Also, many fisherpeople prefer to attach the leader to the hook prior to engaging in the sport of fishing as it is difficult to tie the proper leader knot when his or her hands are wet. Thus, many times fisherpeople become injured by hooks when, trying to obtain a single leader from the tackle box or current fishing leader holders, they become hooked on the hook attached to the leader.

Thus, the need exists for a fishing leader holder exists wherein the leaders do not become entangled, are held internally within a device and are easily and safely accessible to the fisherperson.

The relevant prior art includes the following patents:

| Patent No. (U.S. unless stated otherwise) | Inventor | Issue Date |
| --- | --- | --- |
| 3,713,244 | Alotta | Jan. 30, 1973 |
| 4,977,700 | Perlman et al. | Dec. 18, 1990 |
| 4,437,258 | Allard | Mar. 20, 1984 |
| 2,225,309 | Lawrence | Dec. 17, 1940 |
| 2,667,010 | Anderson | Jan. 26, 1954 |
| 2,670,563 | Anderson | Mar. 02, 1954 |
| 5,337,511 | Ashbaugh | Aug. 16, 1994 |
| 5,440,829 | Parvin | Aug. 15, 1995 |
| 4,961,281 | Listebarger, Jr. | Oct. 09, 1990 |
| 2,448,160 | Behr | Nov. 15, 1949 |

Although the above patents teach various types of fishing leader holders, none teach a cylindrically-shaped fishing leader holder having both a corked end and a fringed end wherein windows are cut into the holder for the acceptance of the leader so the leader is stored within the holder, thereby protecting the leader and enabling a user to retrieve a leader without opening the device.

SUMMARY OF THE INVENTION

The primary object of the present invention is to provide a fishing leader holder that can hold fishing leaders of various lengths and widths.

A further object of the present invention is to provide a fishing leader holder that prevents the leaders from becoming bent.

An even further object of the present invention is to provide a fishing leader holder that allows a user to obtain a threaded leader safely.

A further object of the present invention is to provide a fishing leader holder that protects the leaders by keeping the leaders within the holder.

An even further object of the present invention is to provide a fishing leader holder that accommodates various sized hooks.

A further object of the present invention is to provide a fishing leader holder that is easy to use and easy to carry.

An even further object of the present invention is to provide a fishing leader holder that is lightweight.

The present invention fulfills the above and other objects by providing a fishing leader holder comprised of a holder having two ends that receive fishing hooks. The holder, preferably made of PVC pipe, is cylindrically-shaped, has cut out windows and is hollow. The holder has two ends, a first frayed end and a second corked end. Optional holes may be included on the holder, as well as an optional cap, preferably made of a plastic material so as to resist corrosion. In addition, the holder may be attached to a boat by using a clip and/or line.

There are various methods in which to use the present invention. A first use is whereby the user hangs the hook, which has a leader attached thereto, on the frayed end of the holder. First, the user feeds the leader through a cut out window on the holder. Once the leader is located within the holder, the user places the hook into one of the slots on the frayed end of the holder and hangs the hook therefrom. The user may then place the removable cap on the frayed end so as to keep the hooks and leaders from falling out. To access the hook and leader, the user simply removes the cap and lifts the hook off the frayed end.

A second use is whereby the user inserts the hook and attached leader into the corked end of the holder. The user inserts the leader into a cut out window in the holder. Then, the user simply presses the hook into the cork so it will not become dislodged. To access the hook and leader, the user simply pulls the hook from the cork.

A third use is whereby the user inserts the hook and attached leader into one of the holes cut into the holder. The user first inserts the leader into the holder by feeding it through a cut out window. After the leader is inserted, the user hooks the hook onto a cut out hole on the holder. To access the leader, the user simply removes the hook from the hole.

Although the present invention is described and shown as a holder having a frayed end and a corked end, the invention could also include having a holder that has two frayed ends or two corked ends. In addition, a user may find it easier to first secure the hook onto the holder and then feed the leader through the cut out window, rather than feeding the leader and then securing the hook, as described above. Additionally, although leaders attached to hooks are described, the present invention is also capable of holding leaders attached to clips wherein the clips are securable onto the holder.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 1 is a side view of the fishing leader holder of the present invention;

FIG. 2 is a partial side view of the frayed end of the present invention in use;

FIG. 3 is a side view of the embodiment of FIG. 2 with an optional cap;

FIG. 4 is a partial side view of a corked end of the present invention in use; and FIG. 5 is a top view of the corked end of the present invention.

DESCRIPTION OF THE PREFERRED EMBODIMENTS

For purposes of describing the preferred embodiment, the terminology used in reference to the numbered components in the drawings is as follows:

| | |
|---|---|
| 1. | holder |
| 2. | frayed end |
| 3. | corked end |
| 4. | slot |
| 5. | window |
| 6. | hole |
| 7. | cork |
| 8. | hook |
| 9. | leader |
| 10. | cap |

With reference to FIG. 1, a side view of the present invention is shown. The fishing leader holder has a holder 1, preferably made of PVC pipe, that is hollow and has two ends which can readily accommodate fishing hooks. The holder 1 has a first frayed end 2 with slots 4 and a second corked end 3. Windows 5 and holes 6 are cut out of the holder 1. The slots 4 have a first open end and are rectangular shaped, the windows 5 are trapezoid-shaped, the holes 6 are round, and their respective pluralities are all formed on the circumference of the holder. The windows 5 located below the holes are aligned with each other within a common horizontal plane and the windows 5 located near the corked end 3 are aligned with each other within a different common horizontal plane. The holes 6 are aligned with each other in a separate common horizontal plane.

In FIG. 2, a side view of the frayed end 2 of the present invention in use is shown. The slots 4 on the frayed end 2 are capable of holding fishing hooks 8 on the holder 1. Leaders 9, which are attached to the fishing hooks 8, are then fed into the holder 1 via the cut out windows 5. Additionally, the fishing hooks 8 can be secured to the holder 1 by using the cut out holes 6 on the holder 1 wherein the leaders 9 are also fed into the holder 1 via the cut out windows 5. Because the leaders 9 are now located within the holder 1 and are thus not exposed to the external environment, they are not susceptible to becoming soiled, bent or becoming caught on other objects.

In FIG. 3, a side view of the embodiment of FIG. 2 is shown with a cap 10. The optional cap 10 may be placed upon the frayed end 2 of the holder 1 so as to prevent the hooks 8 from falling out of the slots 4.

With reference to FIG. 4, a side view of the corked end 3 of the holder 1 is shown. Fishing hooks 8 are pressed into the cork 7 so as to hold the fishing hooks 8 securely in place.

Finally, FIG. 5 shows a top view of the corked end 3 of the present invention. The round piece of cork 7 is surrounded by the holder 1 so as to keep the cork 7 secure by frictional engagement with an inner surface of the holder 1 and an end of the piece of cork 7 being flush with the corked end 3 of the holder. The other end of the piece of cork 7 located between parallel sides of each window 5 of the plurality of windows near the corked end 3.

The use of the present invention will allow fishermen and fisherwomen to carry hooked fishing leaders of various lengths and sizes easily without the threat of having the leaders becoming entangled or becoming caught on external objects.

It is to be understood that while a certain form of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:

1. A fishing leader holder comprising:

a hollow, cylindrically-shaped holder having an upper first end and a lower second end which define a longitudinal axis therebetween;

a plurality of rectangular slots formed on a circumference of the holder which extend from the upper first end toward the lower second end such that the slots are parallel to the longitudinal axis of the holder, each of the slots having a first open end defined at the first end of the holder and terminating at a second end;

a plurality of round holes formed around the circumference of the holder below the second ends of the slots and which extend through the holder, the holes being aligned with each other within a first common horizontal plane;

a first plurality of trapezoid-shaped windows formed around the circumference of the holder below the holes and which extend through the holder, the windows being aligned with each other within a second common horizontal plane;

a second plurality of trapezoid-shaped windows formed around the circumference of the holder between the first set of windows and the lower second end and which extend through the holder, the windows being aligned with each other within a third common horizontal plane; and a round piece of cork which is located inside the holder and having first and second ends, the first end of the piece of cork positioned flush with the lower second end and the piece of cork extending from the lower second end upwardly toward the upper first end to the second end of the piece of cork which is located at a position between parallel sides of each window of the second plurality of windows, and the piece of cork being frictionally retained by an inner surface of the holder.

2. The fishing leader holder of claim 1 wherein:
said holder is made of PVC pipe.

3. The fishing leader holder of claim 1 wherein:
at least one of said upper first and lower second ends of said holder has a removable cap.

4. A method of using a fishing leader holder comprising:
providing a hollow, cylindrically-shaped holder having an upper first end and a lower second end which define a longitudinal axis therebetween, the holder further comprising:
  a plurality of rectangular slots formed on a circumference of the holder which extend from the upper first end toward the lower second end such that the slots are parallel to the longitudinal axis of the holder, each of the slots having a first open end defined at the first end of the holder and terminating at a second end;
  a plurality of round holes formed around the circumference of the holder below the second ends of the slots and which extend through the holder, the holes being aligned with each other within a first common horizontal plane;
  a first plurality of trapezoid-shaped windows formed around the circumference of the holder below the holes and which extend through the holder, the windows being aligned with each other within a second common horizontal plane;
  a second plurality of trapezoid-shaped windows formed around the circumference of the holder between the first set of windows and the lower second end and which extend through the holder, the windows being aligned with each other within a third common horizontal plane; and
  a round piece of cork which is located inside the holder and having first and second ends, the first end of the piece of cork positioned flush with the lower second end and the piece of cork extending from the lower second end upwardly toward the upper first end to the second end of the piece of cork which is located at a position between parallel sides of each window of the second plurality of windows, and the piece of cork being frictionally retained by an inner surface of the holder; and
feeding a leader attached to a hook through one of the first plurality of trapezoid-shaped windows or one of the second plurality of trapezoid-shaped windows such that the hook has a portion extending externally of the holder and the leader extends within the holder; and
securing the hook onto the holder by either placing the hook into one of the plurality of rectangular slots or inserting a point of the hook into the piece of cork.

5. The method claimed in claim 1 further comprising the step of:
placing a removable cap on at least one of said upper first and lower second ends of the holder.

* * * * *